United States Patent [19]

Touhsaent

[11] Patent Number: 5,419,960
[45] Date of Patent: May 30, 1995

[54] COATED FILMS WITH GOOD LOW TEMPERATURE SEALING PROPERTIES AN HOT TACK

[75] Inventor: Robert E. Touhsaent, Fairport, N.Y.

[73] Assignee: Mobil Oil Corp., Fairfax, Va.

[21] Appl. No.: 54,991

[22] Filed: Apr. 30, 1993

[51] Int. Cl.$^6$ ................................................ B32B 5/16
[52] U.S. Cl. .................................... 428/331; 428/349; 428/516; 428/910
[58] Field of Search ............... 428/349, 516, 910, 515, 428/331

[56] References Cited

U.S. PATENT DOCUMENTS

| | | | |
|---|---|---|---|
| 5,066,543 | 11/1991 | Hwo | 428/412 |
| 5,126,198 | 6/1992 | Schinkel et al. | 428/349 |
| 5,169,728 | 12/1992 | Murphy et al. | 428/516 |

Primary Examiner—Edith Buffalow
Attorney, Agent, or Firm—Alexander J. McKillop; Malcolm D. Keen; Dennis P. Santini

[57] ABSTRACT

Novel coated films are disclosed wherein a base polymer film, e.g., oriented isotactic polypropylene, is coated with a composition comprising a copolymer of about 65 to 95 wt. % ethylene and about 5 to 35 wt. % of acrylic or methacrylic acid (an "ethylene copolymer") based on the weight of the polymer in which about 2 to 80% of the carboxylate groups are neutralized with metal ions from Group Ia, IIa or IIb of the Periodic Table, preferably sodium ions. Preferably the coating also contains microcrystalline wax and fumed silica. The coated films exhibit good low temperature sealing properties accompanied by satisfactory hot tack and resistance of the seals to immersion in water.

20 Claims, No Drawings

COATED FILMS WITH GOOD LOW TEMPERATURE SEALING PROPERTIES AN HOT TACK

BACKGROUND OF THE INVENTION

1. Field of the Invention

This invention relates to novel coated films such as oriented polypropylene having good hot tack, and low blocking, together with satisfactory low temperature sealing and other properties.

2. Information Disclosure Statement Including Description of Related Art

The following information is being disclosed under the provisions of 37 CFR 1.56, 1.97 and 1.98.

Coatings comprising copolymers of ethylene and acrylic acid (EAA) have advantages over various previously used coatings, such as good low temperature sealing properties, water immersed seals, and resistance to crazing when flexed. However, when these coatings are applied to the sealable side of a base polymer film such as oriented polypropylene (OPP), it has been found in some instances that it would be desirable to have improved hot tack and blocking properties, particularly when the coated film is utilized on a relatively high speed packaging machine. Thus, any means to accomplish the foregoing improvements would be beneficial.

The following references may be pertinent to the invention disclosed herein.

U.S. Pat. No. 5,066,543 issued Nov. 19, 1991 to Hwo, teaches heat sealable wrapping or packing film capable of forming a peelable seal between substrates and comprising a blend of a copolymer of ethylene and an unsaturated carboxylic acid such as acrylic acid, a butene-1 homopoloymer or copolymer, and an ethylene homopolymer or an ethylene/unsaturated ester copolymer.

U.S. Pat. No. 5,126,198, issued Jun. 30, 1992 to Schinkel et al., discloses heat-laminatable multilayer films comprising a polypropylene base layer and at least one additional layer containing a mixture of an ethylene/vinyl acetate copolymer and an ethylene/acrylic acid copolymer.

U.S. Pat. No. 5,169,728 issued Dec. 8, 1992 to Murphy et al., discloses multilayered films wherein a "base" layer comprises a copolymer of ethylene and acrylic or methacrylic acid, and a "surface" layer comprises a copolymer of ethylene and a higher alphaolefin, i.e., a linear low density polyethylene (LLDPE).

SUMMARY OF THE INVENTION

In accordance with this invention, a coated film is provided wherein a base polymer film, e.g., oriented polypropylene (OPP), is coated with a composition comprising a copolymer of, for example, about 65 to 95 wt. % of ethylene and about 5 to 35 wt. % of acrylic or methacrylic acid (an "ethylene copolymer") based on the weight of the polymer, and in which, for example, about 2 to 80% of the carboxyl groups are neutralized with metal ions from Group Ia, IIa, or IIb of the Periodic Table.

It has been found that the foregoing coated film wherein the base polymer film is, for example, oriented polypropylene, provides for good hot tack and blocking properties accompanied by satisfactory low temperature sealing and resistance of the seal to immersion in water.

DETAILED DESCRIPTION OF THE INVENTION

The ethylene copolymer utilized in the compositions of this invention may be a copolymer of, for example, about 65 to 95 wt. %, preferably about 75 to 85 wt. % of ethylene, and, for example, about 5 to 35 wt. %, preferably about 15 to 25 wt. % of acrylic acid (AA) or methacrylic acid (MA). The copolymer may have a number average molecular weight (Mn) of, for example, about 2,000 to 50,000, preferably about 4,000 to 10,000.

The ethylene copolymer is often supplied as a solution or fine dispersion of an ammonium salt of the copolymer in an ammoniacal water solution. When the copolymer is dried, ammonia is given off and the ionized and water sensitive carboxylate groups are converted to largely unionized and less water sensitive free carboxyl groups. In practicing this invention, however, there is added to the solution or dispersion of the ethylene copolymer an amount of ions of at least one metal from Group Ia, IIa or IIb of the Periodic Table, preferably, sodium, potassium, lithium, calcium or zinc ions, and most preferably sodium ions, e.g., in the form of their hydroxides. The quantity of such metallic ions may be in the range sufficient to neutralize, for example, about 2 to 80%, preferably about 10 to 50% of the total carboxylate groups in the copolymer. The presence of such metallic ions has been found to result in an improvement in certain properties, e.g., coefficient of friction (COF), hot tack, and blocking, without an unacceptable sacrifice of other properties, e.g., low minimum seal temperatures (MST).

When the ethylene copolymer is a copolymer of 80 wt. % of ethylene and 20 wt. % of acrylic acid and the neutralizing metal ions are sodium ions added as sodium hydroxide, then the amount of sodium hydroxide added corresponding to the foregoing percentages of carboxylate groups neutralized, is, for example, about 0.33 to 8.8 phr, preferably about 1.1 to 5.5 phr, where "phr" stands for parts by weight per hundred parts of the total resin, which is the same as ethylene copolymer when no other resin is present. For the purpose of determining the phr of various additives present in the coating, all the carboxylate groups of the ethylene copolymer are assumed to be in their free carboxyl (—COOH) form.

In addition to the partially neutralized ethylene copolymer, the coatings of this invention preferably contain a relatively large particle size microcrystalline wax as an anti-blocking agent. The microcrystalline wax may be present in the coating in an amount of, for example, about 2 to 12 phr, preferably about 3 to 5 phr, wherein the wax particles have an average size in the range of, for example, about 0.1 to 0.6 microns, preferably about 0.12 to 0.30 microns.

In addition to functioning as an anti-blocking material, the microcrystalline wax when incorporated into the coatings of the present invention also functions to improve the "cold-slip" properties of the films coated therewith, i.e., the ability of a film to satisfactorily slide across surfaces at about room temperatures.

The coatings of this invention also preferably contain fumed silica for the purpose of further reducing the tack of the coating at room temperature. The fumed silica is composed of particles which are agglomerations of smaller particles and which have an average particle size of, for example, about 2 to 9 microns, preferably about 3 to 5 microns, and is present in the coating in an amount, for example, of about 0.1 to 2.0 phr, preferably about 0.2 to 0.4 phr.

Other optional additives which can be used, include particulate materials such as talc which may be present in an amount, for example, of about 0 to 2 phr, crosslinking agents such as melamine formaldehyde resins which may be present in an amount, for example, of 0 to 20 phr, and anti-static agents such as poly(oxyethylene) sorbitan monooleate which may be present in an amount, for example, of about 0 to 6 phr.

A particular type of thermoplastic film which can be advantageously coated with the coating compositions of this invention is molecularly oriented, isotactic polypropylene. After extrusion of the base polypropylene film utilizing conventional extrusion techniques, the film is heated and molecularly oriented by stretching it both a longitudinal and transverse direction. The resultant oriented film exhibits greatly improved tensile and stiffness properties. However, it is difficult to heat seal by conventional techniques because at the requisite sealing temperature, i.e., on the order of about 350° F., film disorientation and shrinkage occur which can result in the film rupturing and tearing apart. An advantage of this invention when such oriented films are subjected to surface treatment as described hereinafter and subsequently coated with the present coating compositions is that they can be sealed by temperatures sufficiently low to prevent shrinkage of the substrate, i.e., the oriented polypropylene film.

The foregoing description of base films containing a major proportion of polypropoylene is intended to include not only films wherein the polymer is composed entirely of isotactic polypropylene homopolymer, but also coextruded multilayer films wherein the polymer of at least one layer is isotactic polypropylene homopolymer, and the polymer of one or both outer layers is a polymer having better sealability than isotactic polypropylene homopolymer. Such surface layer polymer may be, for example, a copolymer of propylene with a minor amount of one or more other 1-olefins, e.g., ethylene or ethylene and butylene.

Other base polymer films which may be coated in accordance with this invention are those composed of polyolefins other than polypropylene, e.g., polyethylene and those composed of non-hydrocarbon polymers, e.g., polyesters such as polyethylene terephthalate (PET) and polyamides (nylons).

In general, the uncoated substrate films employed in the practice of the present invention are usually from about 0.5 to 3.0 mils in thickness. Of particular interest are coextruded three layer films wherein the polymer of the central core layer is isotactic polypropylene homopolymer having a thickness, for example, of about 70 to 98% of the total thickness of the film, the remainder being two thin outer layers of substantially identical thickness wherein the polymer is an isotactic copolymer of propylene, ethylene in an amount of, for example, 1 to 5 wt. % of the copolymer, and optionally, butylene in an amount, for example, of about 0.5 to 2 wt. % of the copolymer. Also of substantial interest is a coextruded five layer film wherein the polymer of the central core layer is an opaque isotactic polypropylene homopolymer with voids produced by stretch orienting such layer containing spherical particles of a material higher melting than and immiscible with isotactic polypropylene homopolymer, e.g., polybutylene terephthalate, as shown, for example, in U.S. Pat. Nos. 4,632,869 and 4,720,416, such core layer having a thickness, for example, of about 70 to 90% the total thickness of the film; the polymer of the layers contiguous to the central core layer is isotactic polypropylene homopolymer without voids, the thickness of such layers being substantially the same and being, for example, about 2 to 10% of the total thickness of the film; and the polymer of the outer layers is a copolymer of propylene, ethylene and optionally, butylene, as described previously in connection with three layer films, each outer layer having substantially the same thickness, which is, for example, about 1 to 5% of the total thickness of the film.

The coatings of this invention are particularly useful when applied to thicker films, e.g., of about 1 to 2 mils, within the foregoing range, intended to be fed to a relatively high speed horizontal form fill and seal (HFFS) packaging machine operating at a speed of, for example, about 125 to 200 feet per minute (fpm). For this purpose, the percentage of carboxylate groups in the ethylene copolymer which should be neutralized, e.g., with sodium, should be in the range, for example, of about 2.7 to 27%, preferably about 13.5% to prevent the film from failing in packaging operation due to low hot tack, high blocking, and high COF. When the ethylene copolymer is composed of 80 wt. % of ethylene and 20 wt. % of acrylic acid, the amount of sodium hydroxide to be added to the ethylene copolymer corresponding to the foregoing range is about 0.3 to 3.0 phr, preferably 1.5 phr.

When the coated film is fed to a vertical form fill and seal (VFFS) packaging machine which operates at a somewhat lower speed than a HFFS machine, e.g., about 25 to 75 fpm, the percentage of carboxylate groups in the ethylene copolymer which should be neutralized may be somewhat higher than when the film is fed to a HFFS machine, e.g., about 18 to 45%, preferably about 31.5%, corresponding to an amount of sodium hydroxide added to the ethylene copolymer of about 2 to 5 phr, preferably about 3.5 phr when the copolymer is composed of 80 wt. % of ethylene and 20 wt. % of acrylic acid.

To further improve the performance of the film in packaging operation, the second face of the film, i.e., other than the face coated with the composition of this invention, may be coated with a composition comprising a terpolymer of about 2 to 15 wt. % of acrylic or methacrylic acid, 10 to 80 wt. % of methyl or ethyl acrylate, and 10 to 80 wt. % of methyl methyacrylate, together with colloidal silica and carnauba wax, as described in U.S. Pat. No. 3,753,769. Such coating has the effect of reducing the coefficient of friction and slip and also improving the ink adhesion of that surface of the film.

Before applying the coating composition to the appropriate substrate, the surface of the substrate film can be treated to insure that the coating will be strongly adherent to the film thereby eliminating the possibility of the coating peeling or being stripped from the film. This treatment can be accomplished by employing known prior art techniques such as, for example, film chlorination, i.e., exposure of the film to gaseous chlorine, treatment with oxidizing agents such as chromic acid, hot air or steam treatment, flame treatment and the like. Although any of these techniques can be effectively employed to pretreat the film surface, a particularly desirable method of treatment is the so-called electronic treatment method which comprises exposing the film surface to a high voltage corona discharge while passing the film between a pair of spaced electrodes.

After electronic treatment of the substrate film surface, it can be coated with the coating composition of the present invention which coating will then exhibit a tendency to more strongly adhere to the treated film surface.

In applications where even greater coating-to-film adherence is desired, i.e., greater than that resulting from treatment of the film surface by any of the previously described methods, an intermediate primer coating can be employed. In this case, the film is first treated by one of the foregoing methods, electronic treatment being a preferred method, to provide increased active adhesive sites thereon (thereby promoting primer adhesion) and to the thus-treated film surface there is subsequently applied a continuous coating of a primer material. Primer materials which are suitable are well known in the art and include, for example, titanates and poly(ethylene imine). The primer is applied to the electronically treated base film by conventional solution coating means. A particularly effective primer herein is poly(ethylene imine) applied as either an aqueous or organic solvent solution, e.g., of ethanol, containing about 0.5 wt. % of the imine.

The coating composition is applied to the treated surface of the polymer film in any suitable manner such as by gravure coating, roll coating, dipping, spraying, etc. The excess aqueous solution can be removed by squeeze rolls, doctor knives, etc. The coating composition will ordinarily be applied in such an amount that there will be deposited following drying, a smooth, evenly distributed layer of from about 0.02 to about 0.10 mil thickness. In general, the thickness of the applied coating is such that it is sufficient to impart the desired sealability, coefficient of friction (COF), and hot slip characteristics to the substrate polymer film.

The coating once applied to the film is subsequently dried by hot air, radiant heat or by any other suitable means thereby providing a non-water soluble, clear, adherent, glossy coated film product useful, for example, as a packaging film.

The following examples further illustrate the invention.

EXAMPLES 1–33

Thirty-three coating compositions were prepared by adding to an aqueous solution or fine dispersion of 25 wt. % of an ammonium salt of a copolymer of 80 wt. % of ethylene and 20 wt. % of acrylic acid, sold by Michelman as Primacor 4983, varying amounts of sodium hydroxide (NaOH), poly(oxymethylene) sorbitan monooleate anti-static agent (A-S), sold as Glycosperse 0-20, microcrystalline wax having an average size of about 0.12 to 0.2 micron (MWX) sold by Michelman as 41540, and melamine-formaldehyde cross-linking agent (M-F) sold as Cymel 385. In addition, 0.4 phr of talc and 0.1 phr of fumed silica having an average particle size of about 3 to 5 microns sold as Syloid 72 were also added to each composition. All the components were added as an aqueous disperson or solution except the anti-static agent which was added as a pure liquid. Water was then added to bring the final coating composition to a solids content (% SOL) of between 11 and 15 wt. %.

Each of the foregoing coating compositions was applied to one surface of coextruded, three layer, biaxially oriented polypropylene film samples having a total thickness of about 0.9 mil. The polymer of the core layer of each film was a polypropylene homopolymer having a high isotactic content and a melt index of about 3.0, and such core layer was about 0.856 mil in thickness. The polymer of the outer layers was an isotactic copolymer of propylene and about 3.55 wt. % of ethylene, based on the weight of the copolymer, having a melt index of about 6.8. The thickness of each of the outer layers was about 0.022 mil.

The other surface of each of the thirty-three film samples was coated with a composition comprising a terpolymer of methyl methacrylate methyl acrylate and methacrylic acid, colloidal silica, and carnauba wax, with a total solids content of about 13 wt. % as described in U.S. Pat. No. 2,753,769.

The coatings were applied utilizing standard gravure coating apparatus and techniques. Before coating, the film had been treated by subjecting both surfaces thereof to electronic treatment and priming the electronically treated surfaces with a 0.5 wt. % solution of poly(ethylene imine) in a mixture of 85 percent water and 15 percent ethanol. The total coating weight on the oriented, treated, primed film surface following drying of the film was from about 0.5 to 0.9 gram/1,000 in.$^2$ of film, on the surfaces coated with the composition of this invention, and about 0.76 gram/1000 in.$^2$ of film on the surfaces coated with the composition of U.S. Pat. No. 2,753,769.

The amounts of additives in phr which were varied in the coating compositions as well as the solids content of each composition and the drying temperature of the coating in degrees F. (TEMP.), are shown in Table I.

TABLE I

| Example | NaOH | A-S | MWX | M-F | % SOL | TEMP. |
|---|---|---|---|---|---|---|
| 1 | 3.0 | 2 | 6 | 6 | 13 | 230 |
| 2 | 1.5 | 3 | 7 | 3 | 12 | 240 |
| 3 | 1.5 | 1 | 5 | 3 | 12 | 220 |
| 4 | 1.5 | 3 | 5 | 9 | 14 | 240 |
| 5 | 4.5 | 3 | 5 | 3 | 14 | 220 |
| 6 | 1.5 | 1 | 7 | 9 | 14 | 220 |
| 7 | 4.5 | 1 | 5 | 9 | 12 | 240 |
| 8 | 4.5 | 1 | 7 | 9 | 12 | 220 |
| 9 | 4.5 | 3 | 7 | 9 | 12 | 220 |
| 10 | 3.0 | 2 | 6 | 6 | 13 | 230 |
| 11 | 0.0 | 2 | 6 | 6 | 13 | 230 |
| 12 | 6.0 | 2 | 6 | 6 | 13 | 230 |
| 13 | 3.0 | 2 | 6 | 6 | 11 | 230 |
| 14 | 3.0 | 2 | 6 | 6 | 15 | 230 |
| 15 | 3.0 | 2 | 6 | 6 | 13 | 210 |
| 16 | 3.0 | 2 | 6 | 6 | 13 | 250 |
| 17 | 3.0 | 0 | 6 | 6 | 13 | 230 |
| 18 | 3.0 | 4 | 6 | 6 | 13 | 230 |
| 19 | 3.0 | 2 | 4 | 6 | 13 | 230 |
| 20 | 3.0 | 2 | 8 | 6 | 13 | 230 |
| 21 | 3.0 | 2 | 6 | 0 | 13 | 230 |
| 22 | 3.0 | 2 | 6 | 12 | 13 | 230 |
| 23 | 3.0 | 2 | 6 | 6 | 13 | 230 |
| 24 | 3.0 | 2 | 6 | 6 | 13 | 230 |
| 25 | 4.5 | 1 | 5 | 9 | 14 | 220 |
| 26 | 4.5 | 3 | 7 | 9 | 14 | 240 |
| 27 | 4.5 | 1 | 7 | 3 | 12 | 220 |
| 28 | 1.5 | 1 | 7 | 9 | 12 | 240 |
| 29 | 1.5 | 1 | 5 | 3 | 14 | 240 |
| 30 | 1.5 | 3 | 5 | 9 | 12 | 220 |
| 31 | 1.5 | 3 | 7 | 3 | 14 | 220 |
| 32 | 4.5 | 3 | 5 | 3 | 12 | 240 |
| 33 | 3.0 | 2 | 6 | 6 | 13 | 230 |

The coated films of these examples were tested for various properties, the following of which with the indicated headings are shown in Table II. The non-crimp seal strengths in Tables II and III were measured with a Suter tester or tensile tester on seals made with an Askco nine station heat sealer at 5 psi and 2 sec. dwell time at temperatures varied from 200° F. to 280° F.

MST—The temperature in °F. to reach 100 gm/in seal strength.

DELTA—The temperature increase to raise the seal strength from 100 to 300 gm/in, °F.

SS—The average of seal strength measured at 260°, 270° and 280° F., gm/in.

COF—The coefficient of friction determined with an Imass slip/peel tester which has a 2½ in.×2½ in., 200 gram sled with ASTM approved rubber on the bottom, traveling at 6 in/min. (ASTM D1894).

BL—The blocking in gm/in. after one hour at 140° F. and 750 psi of the coated side of the invention to the coated side of the invention of each film, measured by peeling samples apart on a tensile tester.

HAZE—The percent haze on the seal coating determined by the Gardner hazemeter, which measures the percentage of light transmitted through a film which deviates from the incident beam as a result of forward scattering (ASTM D1003).

TABLE II

| Example | MST | DELTA | SS | COF | BL | HAZE |
|---|---|---|---|---|---|---|
| 1 | 214 | 10 | 585 | 0.38 | 5.8 | 1.6 |
| 2 | 204 | 14 | 678 | 0.44 | 8.4 | 1.7 |
| 3 | 201 | 13 | 598 | 0.38 | 7.9 | 1.4 |
| 4 | 202 | 8 | 652 | 0.40 | 9.7 | 1.4 |
| 5 | 214 | 11 | 615 | 0.41 | 6.2 | 1.7 |
| 6 | 203 | 8 | 508 | 0.38 | 8.4 | 1.6 |
| 7 | 223 | 12 | 552 | 0.37 | 5.4 | 1.5 |
| 8 | 224 | 11 | 580 | 0.38 | 5.5 | 1.9 |
| 9 | 224 | 18 | 538 | 0.34 | 7.4 | 1.7 |
| 10 | 213 | 9 | 575 | 0.54 | 6.9 | 1.4 |
| 11 | 192 | 7 | 540 | 0.58 | 40.8 | 1.9 |
| 12 | 235 | 17 | 382 | 0.36 | 7.4 | 1.6 |
| 13 | 214 | 11 | 488 | 0.40 | 6.1 | 1.2 |
| 14 | 213 | 10 | 573 | 0.37 | 7.2 | 1.4 |
| 15 | 204 | 12 | 477 | 0.36 | 6.4 | 1.3 |
| 16 | 213 | 10 | 593 | 0.43 | 5.9 | 1.4 |
| 17 | 213 | 6 | 538 | 0.39 | 6.0 | 1.4 |
| 18 | 213 | 11 | 595 | 0.42 | 6.6 | 1.4 |
| 19 | 212 | 7 | 488 | 0.35 | 7.2 | 1.2 |
| 20 | 216 | 9 | 628 | 0.35 | 5.5 | 1.6 |
| 21 | 202 | 7 | 488 | 0.38 | 7.1 | 1.4 |
| 22 | 214 | 10 | 595 | 0.36 | 5.9 | 1.4 |
| 23 | 213 | 7 | 480 | 0.36 | 6.0 | 1.3 |
| 24 | 216 | 11 | 592 | 0.36 | 6.0 | 1.5 |
| 25 | 224 | 10 | 490 | 0.38 | 6.3 | 1.6 |
| 26 | 236 | 11 | 457 | 0.35 | 5.1 | 1.6 |
| 27 | 220 | 8 | 457 | 0.31 | 7.3 | 1.7 |
| 28 | 206 | 17 | 475 | 0.38 | 7.6 | 1.5 |
| 29 | 195 | 11 | 602 | 0.38 | 10.6 | 1.6 |
| 30 | 203 | 10 | 392 | 0.43 | 10.3 | 1.4 |
| 31 | 193 | 11 | 462 | 0.45 | 10.7 | 1.5 |
| 32 | 222 | 8 | 530 | 0.42 | 5.4 | 1.4 |
| 33 | 214 | 11 | 457 | 0.32 | 6.1 | 1.5 |

The following additional properties with the indicated headings, are shown in Table III, wherein crimp seal strengths were measured on crimp seals made with a Wrap Ade crimp sealer at 20 psi and ¾ sec., having a jaw configuration similar to that of a Campbell wrapper (horizontal form and fill).

HT—The hot tack of the coating as an average of values obtained at 200°, 220°, 240° and 260° F., gm/in., measured using calibrated springs which subject heat sealed samples to known forces immediately after crimp seals are made.

CR-MST—The crimp seal temperature to obtain 100 gm/in seal strength, °F.

CRDL—The temperature increase to raise the crimp seal strength from 100 to 300 gm/in, °F.

CRIMP—The crimp seal strength average of 240°, 260° and 280° F., gm/in.

SS-H$_2$O—The average seal strength at 260°, 270° and 280° F. after 24 hour water immersion at room temperature, gm/in.

D-MST—The temperature needed to obtain a 200 gm/in seal on the trailing edge of the crimp seal on the Doboy HFFS machine running at 150 fpm.

TABLE III

| Example | HT | CR-MST | CRDL | CRIMP | SS-H$_2$O | D-MST |
|---|---|---|---|---|---|---|
| 1 | 95 | 173 | 9 | 614 | 299 | 235 |
| 2 | 49 | 170 | 7 | 679 | 390 | 217 |
| 3 | 49 | 163 | 14 | 619 | 359 | 212 |
| 4 | 49 | 179 | 8 | 664 | 396 | 214 |
| 5 | 188 | 173 | 13 | 616 | 270 | 255 |
| 6 | 49 | 170 | 13 | 613 | 351 | 216 |
| 7 | 188 | 187 | 15 | 654 | 231 | 276 |
| 8 | 200 | 181 | 10 | 661 | 319 | 273 |
| 9 | 142 | 187 | 11 | 652 | 189 | 285 |
| 10 | 108 | 172 | 6 | 660 | 432 | 238 |
| 11 | 20 | 146 | 18 | 619 | 500 | 203 |
| 12 | 177 | 191 | 14 | 611 | 135 | 285 |
| 13 | 108 | 175 | 10 | 595 | 387 | 248 |
| 14 | 110 | 172 | 7 | 621 | 417 | 236 |
| 15 | 110 | 172 | 7 | 658 | 315 | 234 |
| 16 | 108 | 173 | 10 | 685 | 417 | 245 |
| 17 | 165 | 173 | 12 | 625 | 368 | 249 |
| 18 | 99 | 172 | 8 | 627 | 420 | 243 |
| 19 | 151 | 171 | 8 | 600 | 397 | 238 |
| 20 | 108 | 173 | 12 | 651 | 422 | 249 |
| 21 | 110 | 165 | 9 | 662 | 177 | 236 |
| 22 | 122 | 173 | 13 | 667 | 427 | 235 |
| 23 | 122 | 172 | 9 | 637 | 382 | 234 |
| 24 | 62 | 172 | 12 | 607 | 408 | 240 |
| 25 | 165 | 184 | 12 | 589 | 255 | 285 |
| 26 | 144 | 187 | 13 | 662 | 244 | 266 |
| 27 | 188 | 177 | 15 | 618 | 253 | 277 |
| 28 | 34 | 173 | 6 | 600 | 363 | 218 |
| 29 | 59 | 170 | 3 | 628 | 388 | 206 |
| 30 | 59 | 171 | 4 | 555 | 415 | 217 |
| 31 | 59 | 164 | 8 | 592 | 322 | 278 |
| 32 | 162 | 183 | 13 | 650 | 322 | 278 |
| 33 | 108 | 173 | 10 | 565 | 397 | 241 |

The product and process conditions shown in Table I and the values of properties shown in Tables II and III indicate that the coated films of this invention have good hot tack and blocking properties accompanied by satisfactory low temperature sealing and good resistance of the seal to immersion in water. Furthermore, the improved hot tack and blocking obtained provide for the feeding of thicker coated films to high speed HFFS machines and somewhat lower speed VFFS machines without any tearing of the film.

I claim:

1. A base polymer film coated with a composition comprising a copolymer of about 65 to 95 wt. % ethylene and about 5 to 35 wt. % of acrylic or methacrylic acid (an "ethylene copolymer") based on the weight of the polymer, wherein about 2 to 80% of the carboxylate groups are neutralized with metal ions from groups Ia, IIa, or IIb of the Periodic Table.

2. The coated film of claim 1 wherein said base polymer film comprises oriented isotactic polypropylene.

3. The coated film of claim 2 wherein said base polymer film is a multilayer film having wherein the polymer of at least one layer is isotactic polypropylene homopolymer and at least one outer layer is a polymer having better sealability than isotactic polypropylene homopolymer.

4. The coated film of claim 3 wherein said base polymer film is a three layer film wherein the polymer of the central core layer is isotactic polypropylene homopolymer and the polymer of the outer layers is an isotactic copolymer of propylene and ethylene or isotactic terpolymer of propylene, ethylene and butylene.

5. The coated film of claim 3 wherein said base polymer film is a five layer film wherein the film polymer of the central core layer is an opaque isotactic polypropylene homopolymer containing voids, the polymer of the layers contiguous to the central core layer is isotactic polypropylene homopolymer without voids, and the polymer of the outer layers is an isotactic copolymer of propylene and ethylene or isotactic terpolymer of propylene, ethylene and butylene.

6. The coated film of claim 1 wherein said ethylene copolymer is a copolymer of about 75 to 85 wt. % of ethylene and 15 to 25 wt. % of acrylic or methacrylic acid, in which about 10 to 50% of the carboxylate groups are neutralized with sodium, potassium, calcium or zinc ions, said composition having been in the form of an aqueous dispersion or solution applied to said base polymer film by gravure coating, roll coating, dipping or spraying.

7. The coated film of claim 1 wherein said ethylene copolymer is a copolymer of ethylene and acrylic acid.

8. The coated film of claim 6 wherein said carboxylate ions are neutralized with sodium ions.

9. The coated film of claim 1 wherein said coating also comprises microcrystalline wax and fumed silica.

10. The coated film of claim 9 wherein said microcrystalline wax is present in an amount of about 2 to 12 phr and has an average particle size of about 0.1 to 0.6 micron, and said fumed silica is present in an amount of about 0.1 to 2.0 phr and has an average particle size of about 2 to 9 microns.

11. The coated film of claim 1 wherein the base polymer film has a thickness of about 0.5 to 3 mils.

12. The coated film of claim 11 wherein about 2.7 to 27% of the carboxylate groups of said ethylene copolymer are neutralized with sodium ions and said base polymer film has a thickness of about 1 to 2 mils.

13. The coated film of claim 11 wherein about 18 to 45% of the carboxylate groups of said ethylene copolymer are neutralized with sodium ions and said base polymer film has a thickness of about 1 to 2 mils.

14. A coating composition comprising A) a copolymer of about 65 to 95 wt. % ethylene and about 5 to 35 wt. % of acrylic or methacrylic acid (an "ethylene copolymer") based on the weight of the polymer wherein about 2 to 80% of the carboxylate groups are neutralized with metal ions from Groups Ia, IIa or IIb of the Periodic Table; B) microcrystalline wax; and C) fumed silica.

15. The composition of claim 14 wherein said ethylene copolymer is a copolymer of about 75 to 85 wt. % of ethylene and 15 to 25 wt. % of acrylic or methacrylic acid, in which about 10 to 50% of the carboxylate groups are neutralized with sodium, potassium, calcium or zinc ions, said composition being in the form of an aqueous dispersion or solution of said components A), B) and C).

16. The composition of claim 14 wherein said ethylene copolymer is a copolymer of ethylene and acrylic acid.

17. The composition of claim 15 wherein said carboxylate ions are neutralized with sodium ions.

18. The composition of claim 14 wherein said microcrystalline wax is present in an amount of about 2 to 12 phr and has an average particle size of about 0.1 to 0.6 micron, and said fumed silica is present in an amount of about 0.1 to 2.0 phr and has an average particle size of about 2 to 9 microns.

19. A process comprising feeding the coated film of claim 12 to a HFFS machine at a speed of about 125 to 200 fpm.

20. A process comprising feeding the coated film of claim 13 to a VFFS machine at a speed of about 25 to 75 fpm.

* * * * *